Figure 1:
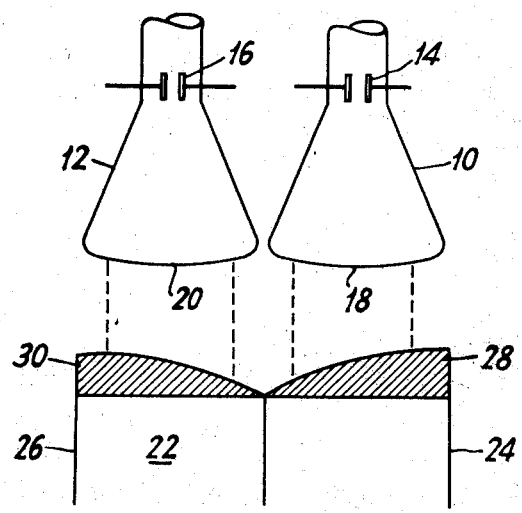

Nov. 10, 1942.   E. STEÜDEL ET AL   2,301,826

OSCILLOGRAPH

Filed Feb. 21, 1940

INVENTORS
EBERHARD STEUDEL
& JOSEF KASPAR
BY
ATTORNEY

Patented Nov. 10, 1942

2,301,826

UNITED STATES PATENT OFFICE 2,301,826

OSCILLOGRAPH

Eberhard Steudel and Josef Kaspar, Berlin, Germany, assignors to General Electric Company, a corporation of New York Application February 21, 1940, Serial No. 320,102
In Germany October 7, 1938

1 Claim. (Cl. 88—14)

It is often necessary to observe at the same time several oscillographic traces. This is the case for instance where two electrical transients or phenomena having a close relation to each other are to be observed, such as for instance where the phase relationship of an alternating current and an alternating potential in a circuit arrangement is to be ascertained.

In cathode ray oscillograph recordings, arrangements have already become known which permit the simultaneous observation of several oscillographic traces. In this connection multiple beam cathode ray tubes have been developed which project all of the oscillographic traces upon the fluorescent screen of the tube such that they can be compared with one another directly and simultaneously. However, such tubes are rather complicated as to structure and are expensive to manufacture. Moreover it is not always possible to so adjust the systems in a tube that all of the deflection systems have the same sensitivity.

For the purpose of observing at the same time the oscillographic traces of two cathode ray tubes it is old in the art to set up both tubes at right angles to one another and to arrange between the screens of said tubes a lightly silvered glass plate such that the latter is inclined to each of the screens at 45 degrees. At viewing, the one screen is observed directly through the glass plate while a mirror image of the other screen is seen.

The present invention relates to an arrangement for the simultaneous observation of oscillographic traces recorded on various cathode ray tube image screens. In accordance with the invention a stereoscopic arrangement is provided which permits of observing all image screens simultaneously and apparently at the same place.

Figure 2:
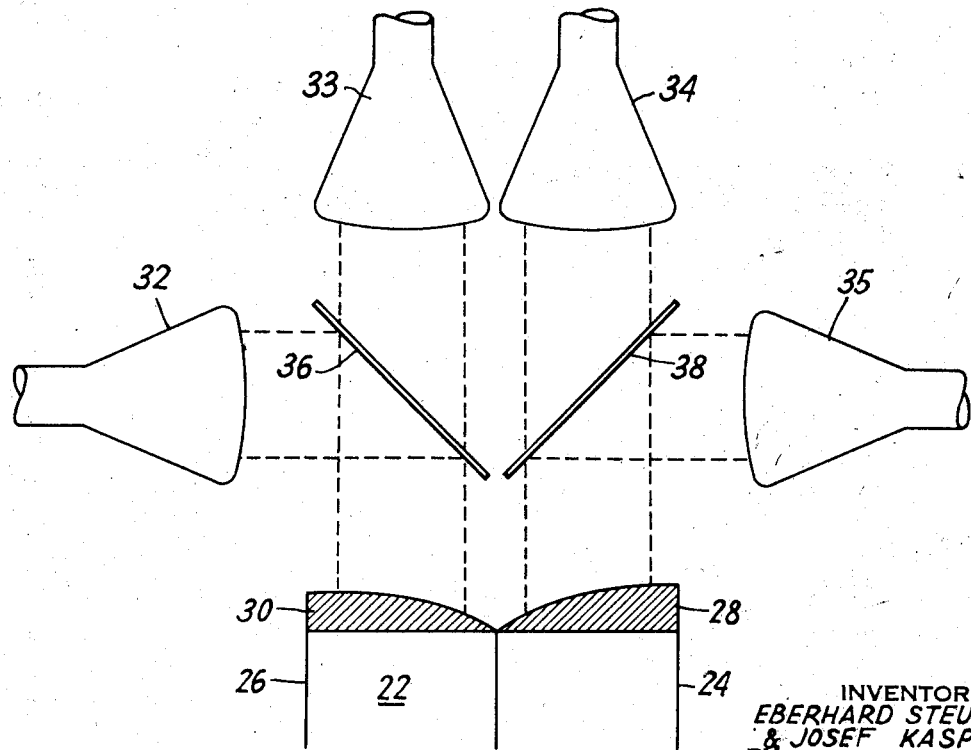

Examples of construction according to the invention will now be described in reference to the drawing wherein:

Figure 1 shows one form of the present invention for simultaneously observing separate oscillographic traces, and Figure 2 shows a modification of the invention.

In Figure 1 two cathode ray oscillograph tubes 10 and 12 are shown whose deflection systems are designated by 14 and 16 and whose fluorescent screens are shown at 18 and 20. Both screens have placed opposite thereto a so-called Brewster stereoscope 22 which is shown as such and which comprises substantially two tubings 24 and 26 each provided with a lens 28 and 30 through which the screens 18 and 20 appear to be situated at the same place so that the oscillographic traces thereon will appear to be superimposed and can be compared immediately.

Figure 2 shows an arrangement for the simultaneous observation of four oscillograph screens appertaining to the cathode ray tubes, 32, 33, 34 and 35. Half silvered glass plates 36 and 38 are provided, and are arranged in a known manner and as already described such that through the glass plate 36 the screens of 32 and 33 can be simultaneously observed while through the glass plate 38 the screens of the tubes 34 and 35 can be simultaneously viewed. Through the stereoscope 22 the image pairs of the screens of 32 and 33 on the one hand, and those of the screens of 34 and 35 on the other hand, are seen moved to the same place so that all four image screens and their oscillographic traces will appear to be superimposed and can be observed at the same time.

The advantages of the arrangement according to the invention over the multiple beam cathode ray tubes are readily recognizable. They reside in the technical simplicity of the arrangement in its reliability and furthermore in the possibility of observing simultaneously several screens on which oscillographic traces are being recorded. Moreover the arrangement is not only useful for the simultaneous observation of cathode ray oscillographic traces but also in the case of observing simultaneously any number of traces recorded on various image screens. As compared with the known arrangement utilizing a semi-transparent glass plate the advantages of the arrangement according to the invention also reside in the more efficient utilization of the light and in the possibility that through the application of this observation method more than two different screens can be viewed.

In order to provide a better orientation where a larger number of traces are to be observed it will be advisable to record the traces in different colors by selecting the respective screens accordingly or by the use of color filters.

In this connection it should be pointed out that the arrangement according to the invention may also serve for reproducing multi-color television images. To this end images of different colors of one and the same television image may be produced, for instance, by using several cathode ray tubes, the image screens upon which the images of different colors are produced may be made to appear at the same place by viewing them through a stereoscopic arrangement.

What is claimed is:

A stereoscopic oscillograph for simultaneously observing four cathode ray tube image screens upon which separate and different oscillographic traces are produced including semi-transparent elements for viewing the image screens in pairs, said elements being so arranged that when viewed through each said element the screens of the respective screen pair appear superimposed, and means including light transmitting stereoscopic lenses whereby both screen pairs when viewed through said lenses appear at the same place and whereby the four separate and distinct oscillographic traces will appear as present on a single screen.

EBERHARD STEUDEL.
JOSEF KASPAR.